E. G. HANTZSCH.
AUTOMOBILE ATTACHMENT.
APPLICATION FILED DEC. 23, 1918.
1,339,822.
Patented May 11, 1920.
2 SHEETS—SHEET 1.
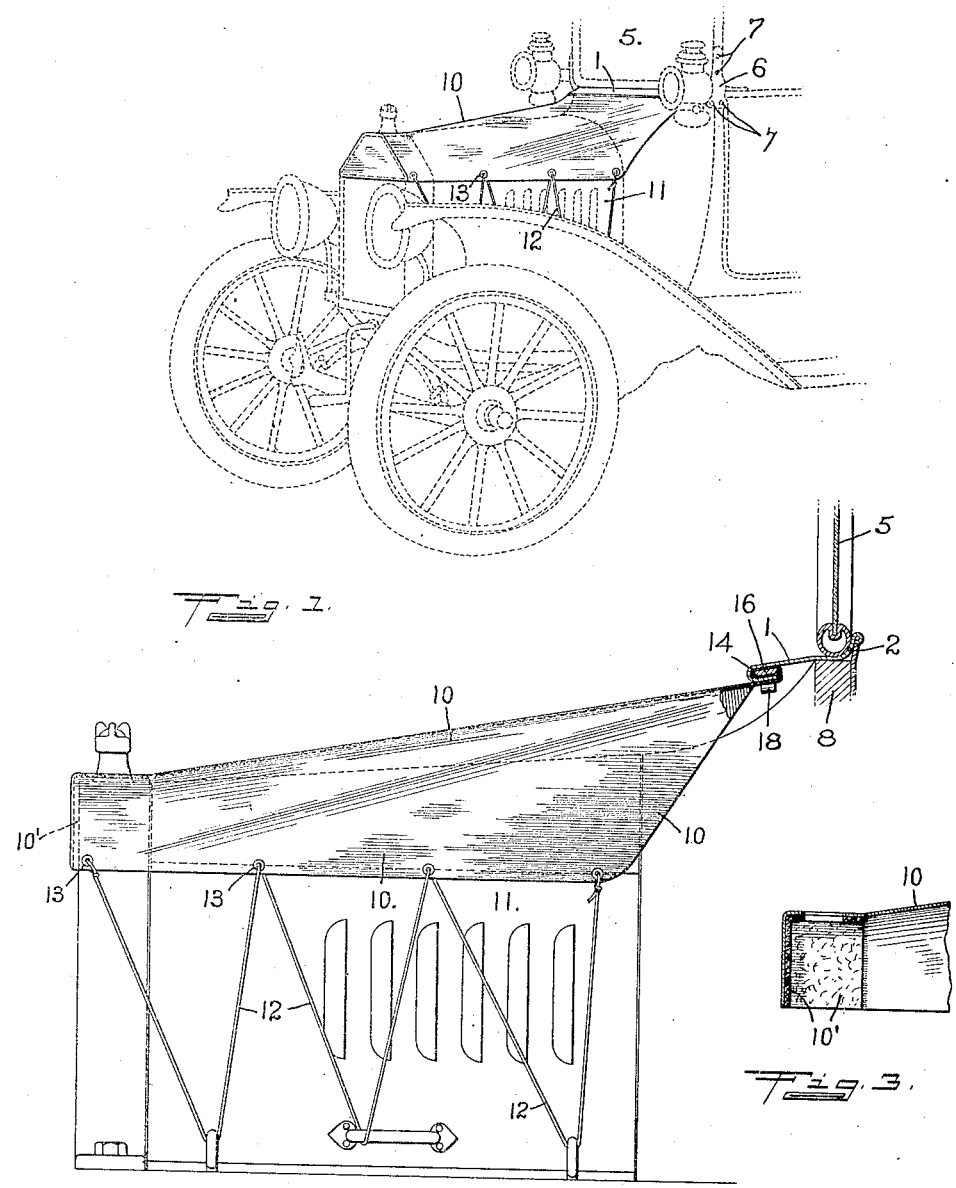
Witness:
A. W. Jamieson
Inventor.
EUGENE G. HANTZSCH,
By Willard Eddy,
Attorney

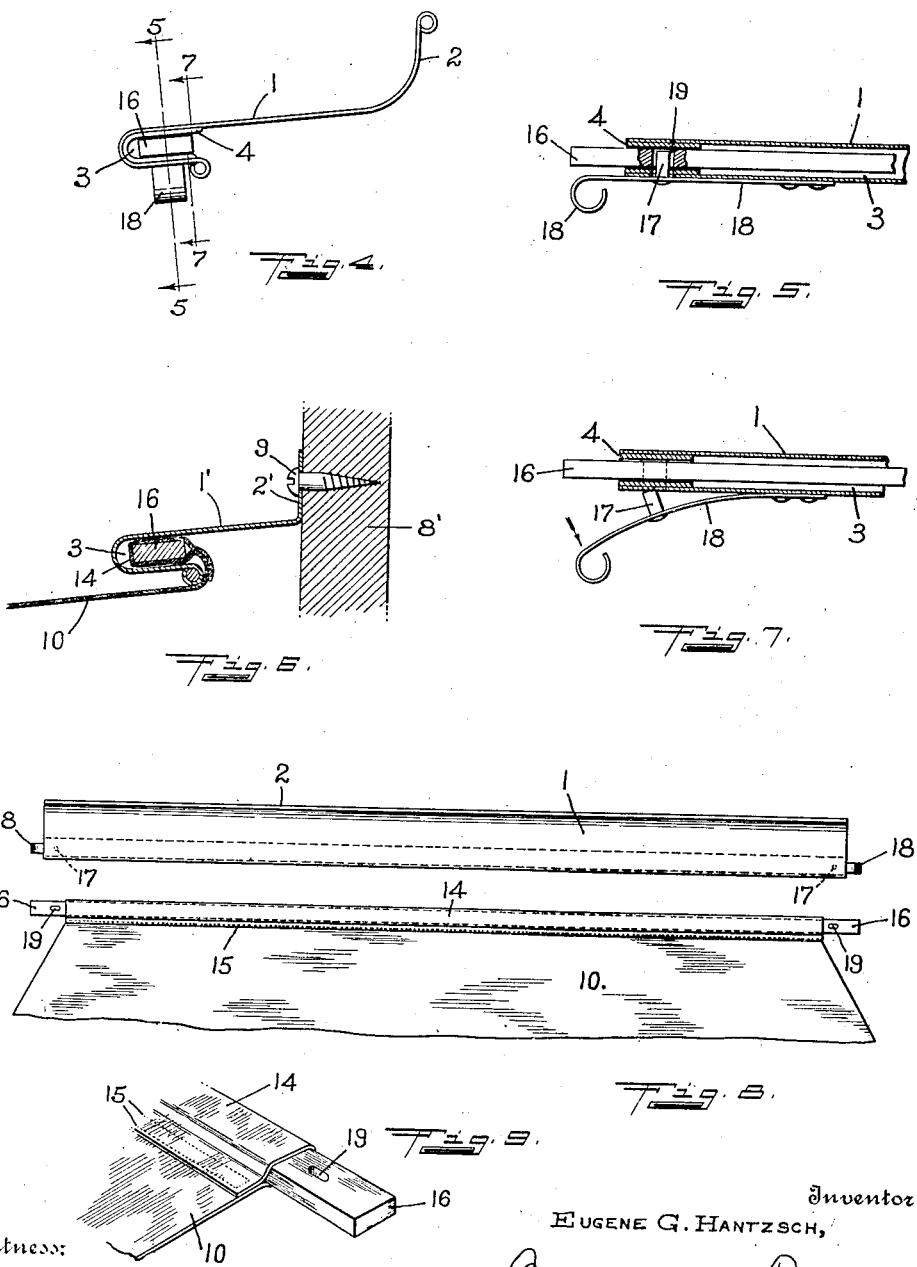

UNITED STATES PATENT OFFICE.

EUGENE G. HANTZSCH, OF OMAHA, NEBRASKA.

AUTOMOBILE ATTACHMENT.

1,339,822. Specification of Letters Patent. Patented May 11, 1920.

Application filed December 23, 1918. Serial No. 268,097.

*To all whom it may concern:*

Be it known that I, EUGENE G. HANTZSCH, a citizen of the United States, residing in the city of Omaha, county of Douglas, and State of Nebraska, have invented certain new and useful Improvements in Automobile Attachments, and have described the same in the following specification, illustrated by the accompanying drawings.

My invention relates to that class of attachments which are applicable to automobiles and are adapted to protect parts thereof from rain and snow. It is the main object of the invention to protect from moisture the entire ignition system of the vehicle, and to keep the motor, spark plugs, wires and other parts in a dry and serviceable condition; to adapt the attachment to be applied to the vehicle, and removed therefrom, easily and conveniently; and to facilitate the detachment and removal of a separable portion of the attachment, as occasion may require, while leaving the remaining portion of the same still secured to the vehicle in an out-of-the-way position. To accomplish these objects, I incorporate in my improved attachment, as parts thereof, an engagement plate, which is of special form and is fitted to engage the vehicle by a waterproof joint, a flexible member, or cover, which is formed of waterproof material and is shaped for engagement with the plate, and a latch for uniting and disuniting in a rain-proof joint the engagement plate and the cover at pleasure.

In said drawings, illustrating the best manner in which I have contemplated applying the principles of the invention, Figure 1 is a perspective view of an automobile attachment which is constructed in accordance with these principles, and shown as applied in actual use to an automobile of a familiar type. Fig. 2 is a side elevation of parts of Fig. 1, including said attachment. Fig. 3 is a longitudinal vertical section of a forward portion of the flexible cover positioned as in use. Fig. 4 is a detailed vertical section of a backward portion of Fig. 2. Fig. 5 is a vertical section on the section line 5—5 in Fig. 4. Fig. 6 is a vertical section, corresponding to Fig. 4, and showing the engagement plate in a modified form. Fig. 7 is a vertical section on the section line 7—7 of Fig. 4. Fig. 8 is a plan of the engagement plate and the flexible cover, disengaged and separated from each other. Fig. 9 is a detailed perspective view of a corner portion of the flexible cover.

In the illustrated specimen of my invention, the engagement plate, denoted by the numeral 1, is of uniform cross section. It is formed from a flat strip of sheet metal, nearly as long as the windshield 5 of the vehicle, by bending the entire back margin of the sheet upward so as to form the stop 2, and by bending the front margin of the same downward and then backward so as to form along the entire length of the plate the broad channel 3 opening backward; this channel, which is best seen in Figs. 4 and 6, is conveniently reinforced at each end of the channel with the metallic lining 4. If the windshield 5 be loosened and slightly lifted in its supporting brackets 6,—an operation which may be facilitated by temporarily loosening the bracket screws 7,—this thin engagement plate may be placed in and partly through the narrow opening so formed between this shield and the frame 8 of the vehicle; and by lowering and re-fastening the shield, the plate is operatively held fast in this opening in the position shown, with the stop 2 behind the windshield. In this way the engagement plate is affixed to the vehicle with any desired permanency and by a joint impervious to water from in front. This plate, if it be constructed in the modified form 1' which is exhibited in Fig. 6, with its back stop 2' disposed in a vertical position, may be imperviously attached to the front 8', or frame, of a truck by means of the screws 9 either with or without packing.

The flexible cover which is above enumerated as one of the parts of the invention, is denoted by the numeral 10. It is formed of waterproof material, has preferably a lining 10' of felt or sheet asbestos, is shaped to fit and cover the top of the hood 11, if any, over the engine and radiator of the vehicle, and is operatively attached to the opposite sides of the vehicle by the cords 12 laced through the holes 13 at opposite edges of the cover. It has along its entire straight rear edge a tubular pocket 14, formed by doubling forward a narrow fold of the cover and sewing it down, as by the stitches 15. When used with a hood which is already provided with an ordinary hood cover, the cover 10 may be abbreviated by cutting off the front portion thereof, and may then overlap only the rear margin of such hood cover.

The engagement plate and cover are separably united by a double latch comprising not only the latch bar 16, occupying the pocket 14, and placed therewith in the channel 3, but also the duplicate latch bolts 17, which are separately attached to the engagement plate by the leaf springs 18 respectively. These bolts play through holes in the bottom wall of the channel 3, and into and out of the duplicate bolt holes 19 which are formed respectively in the opposite and projecting end portions of the bar. Operatively the cover is secured to the engagement plate, as often as may be desired, by pressing the latch bar and the close-fitting pocket 14 forward into the channel 3 until the latch bolts 17 spring into the boltholes 19, and is released from the engagement plate, at pleasure, by appropriate manipulation of the springs 18 and by withdrawal of the latch bar from said channel.

I claim as my invention—

1. An automobile attachment comprising an engagement plate, of uniform cross-section, adapted to be permanently held fast by and between the windshield and the windshield bracket of the vehicle and having its back edge turned upward and its front edge downward, a flexible cover adapted to engage the front margin of the plate, and a spring latch for joining and disjoining the plate and cover.

2. An automobile attachment comprising an engagement plate adapted for permanent attachment to the vehicle, and having its front margin bent down and back to form a channel under the body of the plate, a flexible cover for severable attachment to the plate, and a latch for uniting the rear margin of the cover with the forward margin of the plate and for disuniting the same at pleasure.

Witness my signature at Omaha, Nebraska, December 21st, 1918.

EUGENE G. HANTZSCH.